United States Patent
Behrens et al.

(10) Patent No.: US 11,542,363 B2
(45) Date of Patent: Jan. 3, 2023

(54) MULTICOMPONENT EPOXIDE RESIN COMPOSITION AND CURING AGENT COMPONENT THEREFOR

(71) Applicant: Hilti Aktiengesellschaft, Schaan (LI)

(72) Inventors: Nicole Behrens, Munich (DE);
Alexander Bornschlegl, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 348 days.

(21) Appl. No.: 16/755,512

(22) PCT Filed: Nov. 5, 2018

(86) PCT No.: PCT/EP2018/080129
§ 371 (c)(1),
(2) Date: Apr. 10, 2020

(87) PCT Pub. No.: WO2019/086654
PCT Pub. Date: May 9, 2019

(65) Prior Publication Data
US 2021/0221943 A1    Jul. 22, 2021

(30) Foreign Application Priority Data

Nov. 6, 2017   (EP) .................................. 17200077

(51) Int. Cl.
C08G 59/40 (2006.01)
C08G 59/38 (2006.01)
C08G 59/50 (2006.01)
C08G 59/62 (2006.01)
C08K 5/132 (2006.01)
C08K 5/17 (2006.01)

(52) U.S. Cl.
CPC ......... *C08G 59/4014* (2013.01); *C08G 59/38* (2013.01); *C08G 59/5033* (2013.01); *C08G 59/621* (2013.01); *C08K 5/132* (2013.01); *C08K 5/17* (2013.01)

(58) Field of Classification Search
CPC ........ C08K 5/17; C08K 5/132; C08G 59/621; C08G 59/5033; C08G 59/38; C08G 59/4014
USPC ........................................................ 524/384
See application file for complete search history.

(56) References Cited

U.S. PATENT DOCUMENTS

| 4,933,392 | A  | 6/1990  | Andrews et al. |
| 6,649,729 | B1 | 11/2003 | Scherzer et al. |
| 7,498,389 | B2 | 3/2009  | Vogel et al. |
| 9,796,627 | B2 | 10/2017 | Grun et al. |
| 10,189,744 | B2 | 1/2019  | Dureault et al. |
| 2007/0119745 | A1 | 5/2007 | Vogel et al. |
| 2015/0299378 | A1 | 10/2015 | Chen et al. |
| 2015/0307702 | A1 | 10/2015 | Grün et al. |
| 2016/0159690 | A1 | 6/2016 | Dureault et al. |
| 2016/0355437 | A1 | 12/2016 | Grun et al. |

FOREIGN PATENT DOCUMENTS

| CN | 104718251 | 6/2015 |
| CN | 104837887 | 8/2015 |
| CN | 105377937 | 3/2016 |
| EP | 0 351 365 | 1/1990 |
| EP | 1 716 195 | 11/2006 |
| JP | 2001525469 | 12/2001 |
| JP | 2007523239 | 8/2007 |
| JP | 2011213983 | 10/2011 |
| JP | 2016532742 | 10/2016 |
| WO | 2014/067095 | 5/2014 |
| WO | 2014/090382 | 6/2014 |
| WO | 2015/007879 | 1/2015 |

OTHER PUBLICATIONS

International Search Report dated Jan. 22, 2019 in International Application No. PCT/EP2018/080129 with English translation, 5 pages.
Written Opinion dated Jan. 22, 2019 in International Application No. PCT/EP2018/080129 with English translation, 8 pages.

*Primary Examiner* — David T Karst
(74) *Attorney, Agent, or Firm* — Grüneberg and Myers PLLC

(57) ABSTRACT

A curing agent component is useful for a multicomponent epoxide resin composition. An epoxide resin composition produced using the curing agent component, wherein the curing agent component includes, as a curing agent, at least one Mannich base and an amine that is reactive with respect to epoxide groups, as well as at least one polyphenol from the group of novolac resins as an accelerant. The Mannich base can he obtained by reacting a phenolic compound selected from phenol, styrenated phenol, catechol, resorcinol, hydroquinone, hydroxyhydroquinone, phloroglucinol, pyrogallol, o-cresol, m-cresol, p-cresol and bisphenols, with an aldehyde or an aldehyde precursor and an amine having at least two active hydrogen atoms in the molecule which are bonded to a nitrogen atom. The novolac resin is contained in the curing agent component in a proportion of 5-30 wt. %, based on the organic proportions of the curing agent component.

15 Claims, No Drawings

MULTICOMPONENT EPOXIDE RESIN COMPOSITION AND CURING AGENT COMPONENT THEREFOR

CROSS-REFERENCE TO RELATED APPLICATIONS

This application is a National Stage entry under § 371 of International Application No. PCT/EP2018/080129, filed on Nov. 5, 2018, and which claims the benefit of European Application No. 17200077.0, filed on Nov. 6, 2017. The contents of each of these applications is hereby incorporated by reference in their entirety.

BACKGROUND OF THE INVENTION

Field of the Invention

The invention relates to a multicomponent epoxide resin composition, in particular an epoxide resin composition for fastening purposes, and to a curing agent component for the epoxide resin composition, which contains at least one Mannich base as a curing agent component for epoxides.

Discussion of the Background

Multicomponent mortar compositions based on curable epoxide resins and amine curing agents have been known for some time and are used as adhesives, spackling pastes for repairing cracks and chemical dowels for fastening construction elements such as anchor rods, reinforcing bars, and screws in boreholes of various substrates.

The use of Mannich bases as a constituent of curing agent components for epoxide resins is described inter alia in DE 10 2013 113485 A and WO 2005/090433. Mannich bases are generally used in combination with polyamines and optionally further constituents as curing agent components of multicomponent epoxide resin compositions for fastening purposes. Compared with polyamines such as mXDA, Mannich bases are non-polar substances and are therefore advantageous in that they cannot be easily washed out in wet substrates. A curable composition containing a Mannich base in the curing agent component will therefore exhibit higher pull-out forces after curing in the wet borehole than a comparable composition comprising a curing agent based on low-molecular polyamines.

WO 2014/067095 A describes a curing agent component for epoxides which contains a combination of phenalkamine and styrenated phenol or styrenated phenol novolac. The phenalkamine is a particular, strongly hydrophobic Mannich base which is obtained by reacting cashew nut shell liquid (CNSL), formaldehyde and polyamines such as diethylenediamine.

EP 0 351 365 A discloses epoxide resin compositions comprising a latent curing agent and an accelerant, the accelerant being formed from a Mannich base based on a novolac.

Although the curing speed of mortar compositions based on epoxide resins and Mannich bases can be controlled to a certain extent by the phenol content of the Mannich base, the curing speed otherwise depends on the amine present in the mixture. Conventional epoxide resin compositions which are available on the market and comprise curing agents based on Mannich bases, such as RE 100 (Hilti company, Schaan, Liechtenstein) or FIS EM 390 S (Fischer company, Waldachtal, Del.) have a curing time of at least 12 hours at 20° C. in application, the curing time referring to the time after which the fastening can be subjected to loading. It is expedient to accelerate the curing in order to reduce the waiting times before the next processing step.

SUMMARY OF THE INVENTION

The problem addressed by the invention is therefore that of providing a curing agent component for multicomponent epoxide resin compositions which contains a Mannich base as a curing agent and is suitable for fastening purposes, the multicomponent composition being intended to have a reduced curing time compared with conventional mortar compositions, but with a comparatively high pull-out resistance.

The problem forming the basis of the invention is solved by providing a curing agent component according to an embodiment. Preferred embodiments of the curing agent component according to the invention are provided in the dependent claims, which may optionally be combined with one another.

The invention also relates to a multicomponent epoxide resin composition according to another embodiment.

Preferred embodiments of the epoxide resin composition according to the invention are provided in the dependent claims, which may optionally be combined with one another.

According to the invention, a curing agent component for a multicomponent epoxide resin composition is provided which comprises, as a curing agent, at least one Mannich base and an amine that is reactive with respect to epoxide groups, as well as at least one polyphenol from the group of novolac resins as an accelerant, it being possible to obtain the Mannich base by reacting a phenolic compound selected from the group consisting of phenol, styrenated phenol, catechol, resorcinol, hydroquinone, hydroxyhydroquinone, phloroglucinol, pyrogallol, o-cresol, m-cresol, p-cresol and bisphenols, with an aldehyde or an aldehyde precursor and an amine having at least two active hydrogen atoms in the molecule which are bonded to a nitrogen atom, and the novolac resin being contained in the curing agent component in a proportion of from 5 to 30 wt. %, based on the organic proportion of the curing agent component.

The use of the curing agent component according to the invention in a multicomponent epoxide resin composition for fastening purposes leads to a considerable acceleration of the curing reaction. The cured compositions exhibit outstanding pull-out resistance in wet boreholes and can therefore be subjected to loading after only a short period of time, within approximately 6 hours.

The organic proportion of the curing agent component refers to the weight of the curing agent component less the weight of the inorganic constituents such as sand and/or cement.

According to a preferred embodiment of the curing agent component according to the invention, the amine that is reactive with respect to epoxide groups is selected from the group consisting of aliphatic, alicyclic, araliphatic and aromatic amines. The amine preferably has on average at least two reactive hydrogen atoms per molecule which are bonded to a nitrogen atom.

The amines that can be used as curing agents for epoxide resins in the curing agent component are in principle known to a person skilled in the art. The amine is preferably a polyamine having at least two amino groups in the molecule. Particularly stable networking can be achieved when using polyamines in the curing agent component.

Within the context of the invention, the terms used here and in the following description have the following meanings:

"aliphatic compounds" are acyclic or cyclic, saturated or unsaturated carbon compounds, excluding aromatic compounds;

"alicyclic compounds" are compounds having a carbocyclic ring structure, excluding benzene derivatives or other aromatic systems:

"araliphatic compounds" are aliphatic compounds having an aromatic backbone such that, in the case of a functionalized araliphatic compound, a functional group that is present is bonded to the aliphatic rather than the aromatic part of the compound;

"aromatic compounds" are compounds which follow Hückel's rule (4n+2); and

"amines" are compounds which are derived from ammonia by replacing one, two or three hydrogen atoms with hydrocarbon groups, and have the general structures $RNH_2$ (primary amines), $R_2NH$ (secondary amines) and $RAN$ (tertiary amines) (see: IUPAC Chemical Terminology, $2^{nd}$ ed. (the "Gold Book"), compiled by A. D. McNaught and A. Wilkinson, Blackwell Scientific Publications, Oxford (1997)).

Examples of amines suitable as epoxide curing agents are given in the following, without, however, restricting the scope of the invention: 1,2-diaminoethane (ethylenediamine), 1,2-propanediamine, 1,3-propanediamine, 1,4-diaminobutane, 2,2-dimethyl-1, 3-propanediamine (neopentanediamine), diethylaminopropylamine (DEAPA), 2-methyl-1, 5-diaminopentane, 1,3-diaminopentane, 2,2,4- or 2,4,4-trimethyl-1,6-diaminohexane and mixtures thereof (TMD), 3-aminomethyl-3,5,5-trimethylcyclohexane (isophorone diamine, IPDA), 1,3-bis(aminomethyl)-cyclohexane (1,3-BAC), 1,2-bis(aminomethyl)cyclohexane, hexamethylenediamine (HMD), 1,2- and 1,4-diaminocyclohexane (1,2-DACH and 1,4-DACH), bis(4-aminocyclohexyl)methane (PACM), bis (4-amino-3-) methylcyclohexyl)methane (MACM), bis(4-amino-3,5-dimethylcyclohexyl)methane, diethylenetriamine (DETA), 4-azaheptane-1, 7-diamine, 1,11-diamino-3, 6,9-trioxundecane, 1,8-diamino-3, 6-dioxaoctane, 1,5-diamino-methyl-3-azapentane, 1,10-diamino-4, 7-dioxadecane, bis(3-aminopropyl)amine, 1,13-diamino-4,7, 10-trioxatridecane, 4-aminomethyl-1, 8-diaminooctane, 2-butyl-2-ethyl-1, 5-diaminopentane, N, N-bis(3-aminopropyl)methylamine, triethylenetetramine (TETA), tetraethylenepentamine (TEPA), pentaethylenehexamine (PEHA), 1,3-benzenedimethanamine (m-xylylenediamine, mXDA), 1,4-benzenedimethanamine (p-xyylenediamine, pXDA), 5-(aminomethyl)bicyclo[[2.2.1]hept-2-yl]methylamine (NBDA, norbornane diamine), dimethyldipropylenetramine, dimethylaminopropylaminopropylamine (DMAPAPA), diethylmethylbenzenediamine (DETDA), 4,4'-diaminodiphenylsulfone (dapsone), mixed polycyclic amines (MPCA) (e.g. Ancamine 2168), dimethyldiaminodicyclohexylmethane (Laromin C260), 2,2-bis(4-aminocyclohexyl)propane, (3 (4),8(9)bis (aminomethyldicyclo[5.2.1.0²0.6]decane (mixture of isomers, tricyclic primary amines; TCD-diamine), 1,8-diamino-p-menthane, N-aminoethyl-piperazine (N-AEP), N-3-(aminopropyl)piperazine, piperazine.

Preferred curing agents in the curing agent component according to the invention are polyamines, such as 2-methylpentanediamine (DYTEK A), 3-aminomethyl-3,5,5-trimethylcyclohexane (IPDA), 1,3-benzenedimethanamine (m-xyylenediamine, mXDA), 1,4-benzenedimethanamine (p-xyylenediamine, PXDA), 1,6-diamino-2. 2,4-trimethylhexane (TMD), diethylenetriamine (DETA), triethylenetetramine (TETA), tetraethylenepentamine (TEPA), pentaethylenehexamine (PEHA), N-ethylaminopiperazine (N-EAP), 1,3-bisaminomethylcyclohexane (1,3-BAC), (3(4),8(9)bis (aminomethyl)dicyclo[5,2,1.0$^{2,6}$]decane (mixture of isomers, tricyclic primary amines; TCD-diamine), 1,14-diamino-4, 11-dioxatetradecane, dipropylenetriamine, 2-methyl-1, 5-pentanediamine, N. N'-dicyclohexyl-1,6-hexanediamine, N, N'-dimethyl-1,3-diaminopropane, N, N'-diethyl-1,3-diaminopropane, N, N-dimethyl-1,3-diaminopropane, secondary polyoxypropylenedi- and triamines, 2,5-diamino-2, 5-dimethylhexane, bis(aminomethyl)tricyclopentadiene, 1,8-diamino-p-menthane, bis(4-amino-3, 5-dimethylcyclohexyl)methane, dipentylamine, N-2-(aminoethyl) piperazine (N-AEP), N-3-(aminopropyl) piperazine, piperazine.

The amines can be used both individually and in a mixture of two or more of the specified amines.

The Mannich bases used in the curing agent component according to the invention in combination with the above-described amines are the reaction products of an amine and an aldehyde with a phenolic compound selected from the group consisting of phenol, catechol, resorcinol, hydroquinone, hydroxyhydroquinone, phloroglucinol, pyrogallol, o-cresol, m-cresol, p-cresol, bisphenols such as bisphenol F or bisphenol A, and combinations thereof.

In order to form the Mannich base, the phenolic compound is reacted with a preferably primary or secondary amine and an aldehyde or an aldehyde precursor which results in an aldehyde as a result of decomposition. The aldehyde or the aldehyde precursor may advantageously be added to the reaction mixture as an aqueous solution, in particular at an elevated temperature of from approximately 50° C. to 90° C., and reacted with the amine and the phenolic compound.

Phenol or a styrenated phenol, resorcinol, styrenated resorcinol, bisphenol A or bisphenol F, particularly preferably phenol or a styrenated phenol, styrenated resorcinol or bisphenol A, are preferably used to form the Mannich base.

The aldehyde used to form the Mannich base is preferably an aliphatic aldehyde, particularly preferably formaldehyde. Trioxane or paraformaldehyde, which decompose to form formaldehyde by heating in the presence of water, can preferably be used as an aldehyde precursor.

The amine used for reacting with the aldehyde and the phenolic compound so as to form the Mannich base is preferably one of the above-mentioned amines that is reactive with respect to epoxides, and preferably a polyamine. The amine is preferably present in excess, such that the Mannich base has free amino groups.

According to a further preferred embodiment, the novolac resin used as an accelerant in the curing agent component according to the invention corresponds to the following formula (I)

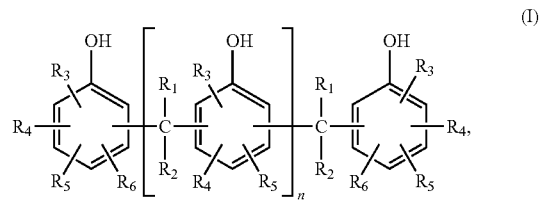

(I)

in which $R_1$ and $R_2$ represent, independently of one another, H or —$CH_3$;

$R_3$, $R_4$, $R_5$ and $R_6$ represent, independently of one another, H, —$CH_3$ or an aliphatic radical, preferably a linear, optionally partially unsaturated, unbranched hydrocarbon chain having up to 15 carbon atoms, or an alkaryl radical, preferably —$C_8H_9$; and where n is 0 to 20, preferably 0 to 15.

Particularly preferably, the novolac resin corresponds to the following formula (II):

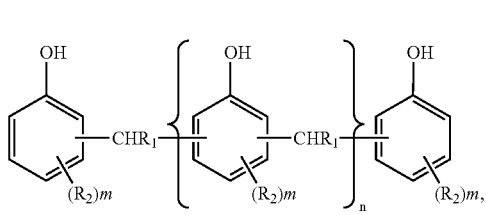

(II)

in which $R_1$ represents H;

$R_2$ represents a $C_1$-$C_{15}$ alkyl radical, preferably a methyl radical or tert-butyl radical;

m is 0, 1 or 2, and preferably 1; and n is 0 to 15, and preferably 0 to 6.

The novolac resin most particularly preferably corresponds to the above formula (II), in which $R_2$ represents —CH and m is 1 or 2, or $R_2$ represents tert-butyl or a $C_1$-$C_{15}$ alkyl radical and m is 1, and where n is 0 to 15, preferably 1 to 15.

The curing agent component according to the invention preferably contains the novolac resin in a proportion of from 8 to 25 wt. %, based on the weight of the organic proportion of the curing agent component.

The amine that is reactive with respect to epoxide resins is preferably contained in the curing agent component according to the invention in a proportion of from 20 to 80 wt. %, particularly preferably 35 to 60 wt. %. Furthermore, the curing agent component preferably contains the at least one Mannich base in a proportion of from 10 to 70 wt. %, particularly preferably 30 to 65 wt. %, in each case based on the weight of the organic proportion of the curing agent component.

In a further embodiment, the curing agent component comprises further additives from the group of solvents, further phenolic accelerants, co-accelerants, adhesion promoters and inorganic fillers.

Non-reactive diluents (solvents) may preferably be contained in amount of up to 30 wt. %, based on the total weight of the curing agent component, for example from 1 to 20 wt. %. Examples of suitable solvents are lower alkyl ketones such as acetone, di lower alkyl lower alkanoyl amides such as dimethylacetamide, lower alkyl benzenes such as xylenes or toluene, phthalic acid esters or paraffins. The curing agent component is preferably free of solvents.

The further phenolic accelerants are preferably selected from salicylic acid, styrenated phenols and cardanol, and mixtures thereof. These may be present in the curing agent component in a proportion of from 0 to 10 wt. %, based on the total weight of the curing agent component.

Benzene alcohol, tertiary amines, imidazole or tertiary aminophenols, organophosphines, Lewis bases or acids such as phosphoric acid esters, or mixtures of two or more thereof, may be used as co-accelerants, for example. The co-accelerants may also be present in the epoxide resin component (A) if it is compatible with the epoxide resins.

The co-accelerants are preferably contained in the curing agent composition in a weight proportion of from 0.001 to 5 wt. %, based on the total weight of the curing agent composition.

Examples of suitable co-accelerants are in particular tris-2,4,6-dimethylaminomethylphenol, 2,4,6-tris(dimethylamino)phenol und bis[(dimethylamino)methyl]phenol. A suitable co-accelerant mixture contains 2,4,6-tris(dimethylaminomethyl)phenol and bis(dimethylaminomethyl)phenol. Mixtures of this kind are commercially available, for example as Ancamine® K54 (AirProducts, Belgium).

By using an adhesion promoter, the cross-linking of the borehole wall with the mortar composition is improved such that the adhesion increases in the cured state. Suitable adhesion promoters are selected from the group of silanes that are functionalized with further reactive organic groups, such as 3-glycidoxypropytrimethoxysilane, 3-glycidoxypropyltriethoxysilane, 2-(3,4-epoxycyclohexyl)ethyltrimethoxysilane, N-2-(aminoethyl)-3-aminopropylmethyldiethoxysilane, N-2-(aminoethyl)-3-aminopropyltriethoxysilane, 3-aminopropytrimethoxysilane, 3-aminopropytriethoxysilane, N-phenyl-3-aminoethyl-3-aminopropyltrimethoxysilane, 3-mercaptopropyltrimethoxysilane and 3-mercaptopropylmethyldimethoxysilane. In particular 3-aminopropyltrimethoxysilane (AMMO), 3-aminopropyltriethoxysilane (AMEO), 2-aminoethyl-3-aminopropyltrimethoxysilane (DAMO) and trmethoxysilylpropydiethylenetetramine (TRIAMO) are preferred as adhesion promoters.

The adhesion promoter may be contained in an amount of up to 10 wt. %, preferably from 0.1 to 5 wt. %, based on the total weight of the curing agent component.

Inorganic fillers, in particular cements such as Portland cement or aluminate cement and other hydraulically setting inorganic substances, quartz, glass, corundum, porcelain, earthenware, baryte, light spar, gypsum, talc and/or chalk and mixtures thereof can be used as fillers. In addition, thickeners such as fumed silica can also be used as an inorganic filler. The inorganic fillers can be added in the form of sands, flours, or molded bodies, preferably in the form of fibers or balls. The fillers may also be present in one or in all components of the multicomponent mortar composition.

The proportion of fillers is preferably 0 to 75 wt. %, for example 10 to 75 wt. %, preferably 15 to 75 wt. % and more preferably 20 to 50 wt. %, even more preferably 25 to 40 wt. %, based on the total weight of the curing agent component.

The present invention also relates to a multicomponent epoxide resin composition, preferably a two-component epoxide resin composition comprising an epoxide resin component (A) containing at least one curable epoxide resin, and at least one curing agent component (B) composed as described above.

The multicomponent epoxide resin composition is preferably used for construction purposes. The expression "for construction purposes" refers to the structural adhesion of concrete/concrete, steel/concrete or steel/steel or one of said materials with other mineral materials, to reinforcement applications with fiber-reinforced polymers of building objects, to chemical fastening of surfaces made of concrete, steel or other mineral materials, in particular chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. Most particularly preferably, the epoxide resin compositions according to the invention are used for chemically fastening anchoring means.

As a curable epoxide in the epoxide resin component (A), a plurality of the compounds known to a person skilled in the art and commercially available for this purpose are considered which contain on average more than one epoxide group, preferably two epoxide groups, per molecule. These epoxide resins may be both saturated and unsaturated as well as aliphatic, alicyclic, aromatic or heterocyclic, and may also have hydroxyl groups. They may also contain substituents which do not cause disruptive secondary reactions under the mixing or reaction conditions, for example alkyl or aryl substituents, ether groups and the like. Trimeric and tetrameric epoxides are also suitable in the context of the invention.

The epoxide resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

The epoxide resins can have an epoxy equivalent weight (EEW) of from 120 to 2000 q/EQ, preferably from 140 to 400, in particular from 155 to 195, for example from 165 to 185. Mixtures of a plurality of epoxide reins may also be used.

Examples of the polyhydric phenols used to prepare the epoxide resins are resorcinol, hydroquinone, 2,2-bis-(4-hydroxyphenyl)-propane (bisphenol A), isomer mixtures of dihydroxyphenylmethane (bisphenol F), tetrabromobisphenol A, novolacs, 4,4'-dihydroxyphenylcyclohexane and 4,4'-dihydroxy-3,3'-dimethyldiphenylpropane.

The epoxide resin is preferably a diglycidyl ether of bisphenol A or bisphenol F or a mixture thereof. Liquid diglycidyl ethers based on bisphenol A and/or F having an EEW of from 180 to 190/g/EQ are particularly preferably used.

Further examples are hexanediol diglycidyl ether, trimethylolpropane triglycidyl ether, bisphenol A-epichlorohydrin resins and/or bisphenol F-epichlorohydrin resins, for example having an average molecular weight of Mn s 2000 g/mol.

The proportion of epoxide resin is >0 to 100 wt. %, preferably 10 to 70 wt. % and particularly preferably 30 to 60 wt. %, based on the total weight of the resin component (A).

In addition to the epoxide resins, the epoxide resin component (A) may optionally contain at least one reactive diluent. Glycidyl ethers of aliphatic, alicyclic or aromatic mono- or in particular polyalcohols having a lower viscosity than epoxide groups containing aromatic groups are used as reactive diluents. Examples of reactive diluents are monoglycidyl ethers, e.g. o-cresyl glycidyl ether, and glycidyl ethers having an epoxide functionality of at least 2, such as 1,4-butanediol diglycidyl ether (BDDGE), cyclohexanedimethanol diglycidyl ether and hexanediol diglycidyl ether, as well as tri- or higher glycidyl ethers, such as glycerol triglycidyl ether, pentaerythritol tetraglycidyl ether or trimethylolpropane triglycidyl ether (TMPTGE). Mixtures of two or more of these reactive diluents may also be used, preferably mixtures containing triglycidyl ethers, particularly preferably as a mixture of 1,4-butanediol diglycidyl ether (BDDGE) and trimethylolpropane triglycidyl ether (TMPTGE).

The reactive diluents are preferably present in an amount of from 0 to 60 wt. %, in particular from 1 to 20 wt. %, based on the total weight of the resin component (A).

The proportion of the epoxide component (A) in the total weight of the multicomponent mortar composition is preferably 5 to 90 wt. %, in particular 20 to 80 wt. %, 30 to 70 wt. % or 40 to 60 wt. %.

Suitable epoxide resins and reactive diluents can also be found in the standard reference from Michael Dombusch, Ulrich Christ and Rob Rasing, "Epoxidharze", Vincentz Network GmbH & Co. KG (2015), ISBN 13: 9783866308770. These compounds are included here by reference.

Furthermore, the epoxide resin component (A) can contain conventional additives, in particular adhesion promoters and fillers, as already described for the curing agent composition.

The adhesion promoter may be contained in an amount of up to 10 wt. %, preferably 0.1 to 5 wt. %, based on the total weight of the epoxide resin component (A).

The proportion of fillers is preferably 0 to 75 wt. %, for example 10 to 75 wt. %, preferably 15 to 75 wt. %, and more preferably 20 to 50 wt. %, even more preferably 25 to 40 wt. %, based on the total weight of the epoxide resin component (A).

Further conceivable additives to the multicomponent epoxide resin composition are also thixotropic agents such as optionally organically after-treated fumed silica, bentonites, alkyl- and methylcelluloses and castor oil derivatives, plasticizers such as phthalic or sebacic acid esters, stabilizers, antistatic agents, thickeners, flexibilizers, curing catalysts, rheology aids, wetting agents, coloring additives such as dyes or pigments, for example for different staining of components for improved control of their mixing, as well as wetting agents, desensitizing agents, dispersants and other control agents for the reaction rate, or mixtures of two or more thereof.

The multicomponent epoxide resin composition is preferably present in cartridges or film pouches which are characterized in that they comprise two or more separate chambers in which the epoxide resin component (A) and the curing agent component (B) of the mortar composition are separately arranged so as to prevent a reaction.

For the use as intended, the epoxide resin component (A) and the curing agent component (B) are discharged out of the separate chambers and mixed in a suitable device, for example a static mixer or dissolver. The mixture of epoxide resin component (A) and curing agent component (B) is then introduced into the previously cleaned borehole by means of a known injection device. The component to be fixed is then inserted into the mortar composition and aligned. The reactive constituents of the curing agent component (B) react with the epoxides of the resin component (A) by polyaddition such that the epoxide resin composition cures under environmental conditions within a desired period of time, preferably within minutes or hours.

Components A and B are preferably mixed in a ratio that results in a balanced stoichiometry according to the EEW and AHEW values.

The AHEW value (amine hydrogen equivalent weight, H equivalent) provides the amount of the curing agent component which contains 1 mol of reactive H. The AHEW is determined in a manner known to a person skilled in the art on the basis of the formulation of the reaction mixture from the known H equivalents of the used reactants and raw materials from which they are calculated.

In the example of meta-xylylenediamine ($M_w$=136 g/mol, functionality=4 eq/mol), the AHEW is calculated as follows by way of example:

$$\text{General formula } AHFW = \frac{Mw}{\text{Functionality}} = \frac{136}{4}\left[\frac{g}{eq}\right] = 34\left[\frac{g}{eq}\right]$$

The EEW (epoxide equivalent weight-epoxide equivalent values) are generally provided by the manufacturers of the epoxide resin components used in each case or are calculated according to known methods. The EEW provide the amount in g of epoxide resin which contains 1 mol of epoxide groups.

Experimentally, the AHEW was obtained by determining the glass transition temperature (Tg) from a mixture of epoxide resin (with known EEW) and an amine component. In this case, the glass transition temperatures of epoxide resin/amine mixtures were determined with different ratios. The sample was cooled at a heating rate of −20 K/min from 21 to −70° C., heated in a first heating cycle to 250° C. (heating rate 10 K/min), then re-cooled to −70° C. (heating rate −20 K/min) and heated to 200° C. in the last step (20 K/min). The mixture having the highest glass transition temperature in the second heating cycle ("$T_g2$") has the optimum ratio of epoxide resin and amine. The AHEW value can be calculated from the known EEW and the optimum epoxide resin/amine ratio.

Example: EEW=158 g/mol

Mixture amine/epoxide resin having a maximum $T_g2$: 1 g amine with 4.65 g epoxide resin $$AHHW = \frac{1}{4.65} \cdot 158 = 34\left[\frac{g}{eq}\right]$$

DETAILED DESCRIPTION OF EMBODIMENTS

Further advantages of the invention can be found in the following description of preferred embodiments, which, however, are not understood to be in any way limiting.

Preparation of the Mannich Base

General Preparation instructions

The Mannich bases can be prepared according to methods known per se, as specified in the following:

2 mol of one or more amines are provided in a 250 ml three-necked flask having a thermometer, a dropping funnel and a stirrer. The amine provided is mixed with approximately 1 mol of phenol or styrenated phenol by stirring. The mixture is heated to approximately 80° C. Then, with vigorous stirring, approximately 0.7 mol of formaldehyde is added in drops as a 37% formaldehyde solution in water for approximately 45 minutes. After completion of the addition of formaldehyde, the reaction mixture is reheated to approximately 105° C., and the reaction mixture is held at this temperature for approximately 120 minutes. Then, water is distilled off under increasing vacuum at a suitable temperature (e.g. approximately 110° C.). Once the pressure is reduced enough (e.g. to approximately 50 mbar), the temperature may be further increased to approximately 130° C. and then held at this temperature for some time, for example approximately 60 minutes, in order to remove the remaining water from the reaction mixture.

Synthesis of the Mannich Base MBS2

220 g (0.91 mol) of Novares LS 500 (styrenated phenol from Rutgers Novares GmbH, Germany, average molar mass 243 g/mol) is mixed with 190.4 g (221 ml, corresponding to 1.64 mol, 1.8 eq) of 1,5-diamino-2-methylpentane in a 1 L three-necked flask having a KPG stirrer and an internal thermometer, and the reaction mixture is heated to 80° C. (internal temperature). Subsequently, 115 ml (1.46 mol, 1.6 eq) of formaldehyde (37%; 10-15% MeOH as a stabilizer, d=1.09 g/cm$^3$) is carefully added in drops. During the addition of formaldehyde, the temperature of the reaction mixture should not exceed 90° C. (exothermic reaction). After complete addition of the formaldehyde solution, the reaction mixture is stirred for a further 45 minutes at 85 to 90° C. The mixture is then heated to 100° C. and kept at this temperature for 1 h. Subsequently, at approximately 140° C. the resulting water and excess formaldehyde are blown off in a strong stream of nitrogen for 3 h. The product solidifies on cooling to room temperature.

The yield of Mannich base amounts to 456 g of raw product.

Synthesis of the Mannich Base MBS1

504 g (2.07 mol) of Novares LS 500 is mixed with 601 ml (4.6 mol; 2.2 eq; d=1.032 g/cm$^3$) of m-xylylenediamine in a 2 L three-necked flask having a KPG stirrer and an internal thermometer, and the reaction mixture is heated to 80° C. (internal temperature). Subsequently, 327 ml (4.15 mol) of formaldehyde (37%; 10-15% MeOH as a stabilizer, d=1.09 g/cm$^3$) is slowly added for approximately 1.5 h. During the addition of formaldehyde, the temperature of the reaction mixture should not exceed 90° C. (exothermic reaction). After complete addition of the formaldehyde solution, the reaction mixture is stirred for a further 2 h at 85 to 95° C. The mixture is then heated to 100° C. and kept at this temperature for approximately 1 h. Subsequently, at approximately 140° C., the resulting water and excess formaldehyde are blown off in a strong stream of nitrogen for 3 h. The product solidifies on cooling to room temperature.

The yield of Mannich base amounts to 1.13 kg of raw product.

Examples 1 to 4 and Comparative Examples 1 and 2

Determination of the Reaction Kinetics by Temperature Measurement

Curing agent components having a different proportion of novolac resin and different novolac resins were prepared in order to achieve curing of the mixtures of curing agent component and epoxide resin component over the temperature curve of the curing reaction. It was found in this case that the temperature curve of the curing reaction can be adjusted in a wide range by varying the novolac resin and the proportion thereof in the curing agent component.

The amount specifications in the following examples are in weight percent (wt. %).

In order to prepare the epoxide resin component A, the constituents specified in the following table were mixed in a speed mixer. The epoxide equivalent EEW of the mixture was 158 g/EQ.

In addition, different curing agent components B composed as specified in the following table 2 were prepared. The Mannich base MBS2 obtained according to the above-described synthesis instructions and m-xyylenediamine (mXDA; manufacturer; Aldrich. Germany) were used as amine curing agents. The phenol novolac resin available under the trade name Phenolite TD-2093Y from DIC Europe, Germany, was used as an accelerant.

TABLE 1

Composition of the epoxide resin component A

| Substance | Function | Wt. % | Trade name | Manufacturer | Country |
|---|---|---|---|---|---|
| Bisphenol A-based epoxide resin | Epoxide resin | 52 | DER 330 | Dow Europe | CH |
| Bisphenol F-based epoxide resin | Epoxide resin | 28 | DER 354 | Dow Europe | CH |
| 1,4-butanediol-diglycidyl ether | Reactive diluent | 10 | Polypox R3 | Dow Europe | CH |
| Trimethyol-propane-triglycidyl ether | Reactive diluent | 10 | Araldite DY-T | Huntsman | BE |

TABLE 2

Composition of the curing agent component B

| | MBS2 | mXDA | Phenol novolac | AHEW | Weight ratio component A:B |
|---|---|---|---|---|---|
| Comparative example 1 | 20 | 80 | 0 | 40.77 | 3.88 |
| Comparative example 2 | 50 | 50 | 0 | 58.12 | 2.72 |
| Example 1 | 50 | 48 | 2 | 60.18 | 2.63 |
| Example 2 | 50 | 45 | 5 | 63.55 | 2.49 |
| Example 3 | 20 | 65 | 15 | 49.71 | 3.18 |
| Example 4 | 10 | 68 | 22 | 48.78 | 3.24 |

The epoxide component A was in each case mixed with one of the curing agent components B in the weight ratio specified in table 2 in the speed mixer. The mixture was poured into a 20 ml rolled-edge glass. A temperature sensor was placed in the middle of the rolled-edge glass and the change in temperature of the mixture was recorded (device: Yokogawa, DAQ station, model: DX006-3-42). The change in temperature overtime serves as a measure for the curing of the mixture. If there is acceleration of the curing, the maximum temperature is shifted to shorter times. Furthermore, there is also a higher maximum temperature in most cases. The time $t_{+10K}$ after which a temperature increase of 10 K has taken place, the maximum temperature $T_{max}$ reached and the time $t_{Tmax}$ after which the maximum temperature was reached are measured.

The results of the changes in temperature achieved for the different curing agent components B during the curing reaction are given in the following table 3.

TABLE 3

Temperature curve during curing

| | $t_{+10K}$ [h:min:sec] | $T_{max}$ [° C.] | $t_{Tmax}$ [h:min:sec] |
|---|---|---|---|
| Comparative example 1 | — | 29.1 | 04:26:57 |
| Comparative example 2 | 1:26:45 | 129.6 | 02:39:55 |
| Example 1 | 1:13:51 | 138.3 | 01:39:28 |
| Example 2 | 00:53:25 | 151.9 | 01:15:01 |
| Example 3 | 00:35:40 | 150.1 | 01:09:33 |
| Example 4 | 00:19:24 | 189.3 | 00:39:27 |

The results of the curing reaction temperature curve for the different curing agent components B show that there is no temperature increase of 10 K with the composition of comparative example 1. The maximum temperature, measured after approximately 4.5 hours, is merely 29° C. The curing agent component B of comparative example 2 produces a temperature increase of 10 K after approximately 1.5 hours, and the maximum temperature of 130° C. is measured after approximately 2.65 hours.

The curing agent components B according to examples 1 to 4 achieve a temperature increase of 10 K after 19 to 74 minutes, and the maximum temperatures are from 138 to 190° C. The maximum temperatures are therefore significantly above those of the comparative examples. In particular, the maximum temperatures are already reached after a time of between 39 minutes and 1.65 hours, and therefore at least one hour earlier than in comparative example 2. Adding the novolac resin thus leads to a significant acceleration of the reaction and thus of the curing. The acceleration depends on the concentration of the phenol novolac—it being possible to achieve a significant acceleration with higher concentrations—and on the type of phenol novolac used.

Examples 5 and 6 and Comparative Example 3

Determination of the Reaction Kinetics by Temperature Measurement

In order to prepare the epoxide resin component A, the constituents specified in the above table 1 were mixed in a speed mixer. The epoxide equivalent EEW of the mixture was 158 g/EQ.

In addition, different curing agent components composed as specified in the following table 4 were prepared. A Mannich base based on bisphenol A and the amine mXDA and available under the trade name Epikure 132 from Momentive Specialty Chemicals, the Netherlands, as well as mXDA (manufacturer Aldrich, Germany) and 1,3-cyclohexanediemethanamine (1,3-BAC) from Itochu Deutschland were used as amine curing agents. A phenol novolac resin available under the trade name Phenolite TD-2131 from DIC Europe, Germany, was used as an accelerant.

TABLE 4

Composition of the curing agent component B

| | Epikure 132 | mXDA | 1,3-BAC | Phenol novolac | AHEW | Weight ratio component A:B |
|---|---|---|---|---|---|---|
| Example 5 | 50 | 38 | 0 | 12 | 48.50 | 3.26 |
| Example 6 | 50 | 0 | 38 | 12 | 63.55 | 2.49 |
| Comparative example 3 | 100 | 0 | 0 | 0 | 53.0 | 2.98 |

The epoxide component A was in each case mixed with one of the curing agent components B in the weight ratio specified in table 2. The mixture was poured into a 20 ml rolled-edge glass. A temperature sensor was placed in the middle of the rolled-edge glass and the change in temperature of the mixture was recorded (device: Yokogawa, DAQ station, model: DX1006-3-4-2). The change in temperature over time serves as a measure for the curing of the mixture. If there is acceleration of the curing, the maximum temperature is shifted to shorter times. Furthermore, there is also a higher maximum temperature in most cases. The time $t_{+10K}$ after which a temperature increase of 10 K has taken place, the maximum temperature $T_{max}$ reached and the time $t_{Tmax}$ after which the maximum temperature was reached are measured.

The results of the changes in temperature achieved for the different curing agent components B during the curing reaction are given in the following table 5.

TABLE 5

Change in temperature during curing

| | $t_{+10K}$ [h:min:sec] | $T_{max}$ [° C.] | $t_{Tmax}$ [h:min:sec] |
|---|---|---|---|
| Example 5 | 00:22:49 | 183.8 | 00:48:03 |
| Example 6 | 00:13:36 | 200.0 | 00:36:18 |
| Comparative example 3 | 00:33:30 | 80.0 | 01:27:06 |

Again, the compositions comprising the curing agent components B according to the invention exhibit more rapid curing behavior according to examples 5 and 6 than comparative example 3. Both the temperature increase by 10 K and the time after which the maximum temperature is reached are shorter than in the comparative example. The maximum temperature reached for the curing agent components B in examples 5 and 6 is, at 184 and 200° C., respectively, also significantly higher than the maximum temperature of 80° C. reached for the curing agent component of comparative example 3.

Examples 7 to 10 and Comparative Examples 4 to 7

Determination of the Failure Load after Different Curing Times

In order to prepare the epoxide resin component A, the constituents specified in the following table 6 were mixed in a speed mixer. The epoxide equivalent EEW of the mixture was 257 g/EQ.

TABLE 6

Composition of the epoxide resin component A

| Component | Function | Wt. % | Trade name | Manufacturer |
|---|---|---|---|---|
| 3-glycidyloxy-propyl-trimethoxysilane | Adhesion promoter | 2.6 | Dynasylan GLYMO | Evonik Industries, DE |
| Bisphenol A-based epoxide resin | Epoxide resin | 31.1 | DER 330 | Dow Europe, CH |
| Bisphenol F-based epoxide resin | Epoxide resin | 16.6 | DER 354 | Dow Europe, CH |
| 1,4-butanediol-diglycidyl ether | Reactive diluent | 6 | Polypox R3 | Dow Europe, |
| Trimethylolpropane-triglycidyl ether | Reactive diluent | 6 | Araldite DY-T | Huntsman, BE |
| Quartz | Filler | 35 | Millisil W12 | Quarzwerke Frechen, DE |
| Silica | Thickener | 2.7 | Cab-O-Sil TS-720 | Cabot Rheinfelden, DE |

In order to prepare the different curing agent components B, the constituents specified in the following table 7 were used and mixed together in the composition specified in the following table 8. The mXDA-resorcinol-based Mannich base was synthesized analogously to the synthesis instructions in EP 0645 408. The mXDA-resorcinol-based Mannich base, dissolved in mXDA, was used as a curing agent. The content of free mXDA was 60%.

TABLE 7

Constituents of the curing agent components B

| Constituent | Function | Trade name | Manufacturer | Country |
|---|---|---|---|---|
| Mannich base MBS2 | Curing agent | | | |
| Mannich base MBS1B | Curing agent | | | |
| mXDA-bisphenol A-based Mannich base in mXDA | Curing agent | Epikure 132 | Momentive Specialty Chemicals | NL |
| mXDA-resorcinol-based Mannich base, dissolved in mXDA | Curing agent | | | |
| Novolac | Accelerant | Phenolite TD-2131 | DIC Europe | DE |
| 4,4'-dihydrodi-phenylmethane | Accelerant | Bisphenol F | TCI Europe | BE |
| 2,4'-dihydroxydi-phenylmethane | Accelerant | 2,4-Bisphenol F | TCI Europe | BE |
| 1,3-cyclohexane-dimethanamine | Curing agent | 1,3-BAC | Itochu Deutschland | DE |
| m-xylylenediamine | Curing agent | mXDA | Itochu Deutschland | DE |
| 3-aminopropyl-triethoxysilane | Adhesion promoter | Dynasylan AMEO | Evonik Degussa | DE |
| 2,4,6-tris(dimethyl-amino-methyl)phenol, bis[(dimethylamino)-methyl]phenol | Accelerant | Ancamine K54 | Air Products | NL |
| Quartz | Filler | Millisil W12 | Quarzwerke Frechen | DE |
| Silica | Thickener | Cab-O-Sil TS-720 | Cabot Rheinfelden | DE |

TABLE 8

Composition of the curing agent components B

| Constituent | Example 7 | Comparative example 4 | Example 8 | Comparative example 5 |
|---|---|---|---|---|
| MBS2 | 26.3 | 26.3 | | |
| MBS1B (MBS1, 75% dissolved in mXDA) | | | 35.2 | 35.2 |
| Novolac | 6.3 | | 6.3 | |
| 1,3-BAC | 26.1 | 32.4 | | |
| mXDA | | | 17.1 | 23.4 |
| 3-aminopropyl-triethoxysilane | 1.9 | 1.9 | 1.9 | 1.9 |
| Ancamine K54 | 1.9 | 1.9 | 1.9 | 1.9 |
| Quartz | 35 | 35 | 35.1 | 35.1 |
| Silica | 2.5 | 2.5 | 2.5 | 2.5 |
| AHEW | 113 g/EQ | 94 g/EQ | 92 g/EQ | 78 g/EQ |

| Substance | Example 9 | Comparative example 6 | Example 10 | Comparative example 7 |
|---|---|---|---|---|
| Epikure 132 | 47.4 | 54 | | |
| mXDA-resorcinol-based Mannich base in mXDA | | | 49.3 | 49.3 |
| Novolac | 6.4 | | 6.7 | |
| mXDA | 3.9 | 3.4 | | 6.7 |
| 3-aminopropyl-triethoxysilane | 1.9 | 2 | 2 | 2 |
| AncamineK54 | 1.9 | 2 | 2 | 2 |
| Quartz | 35.9 | 36 | 37.3 | 37.3 |
| Silica | 2.6 | 2.6 | 2.7 | 2.7 |
| AHEW | 97 g/EQ | 88 g/EQ | 96 g/EQ | 81 g/EQ |

| Substance | Example 11 | Example 12 | Example 13 | Example 14 |
|---|---|---|---|---|
| Epikure 132 | — | 49.0 | 49.0 | 50.8 |

TABLE 8-continued

| Composition of the curing agent components B | | | | |
|---|---|---|---|---|
| mXDA-resorcinol-based Mannich base in mXDA | 49.3 | — | — | — |
| 4,4-dihydroxydiphenylmethane | 6.7 | 5.0 | 2.5 | 1.5 2.0 |
| 2,4'-dihydroxydiphenylmethane | — | — | 2.5 | 1.6 |
| mXDA | — | 3.4 | 3.4 | 3.5 |
| 3-aminopropyl-triethoxysilane | 2.0 | 2.0 | 2.0 | 2.0 |
| Ancamine K54 | 2.0 | 2.0 | 2.0 | 2.0 |
| Quartz | 37.3 | 36.0 | 36.0 | 36.0 |
| Silica | 2.7 | 2.6 | 2.6 | 2.6 |
| AHEW | 96 g/EQ | 96 g/EQ | 96 g/EQ | 93 g/EQ |

In order to prepare curable epoxide resin compositions, components A and B are mixed in the speed mixer in a ratio resulting in a balanced stoichiometry according to the EEW and AHEW values. The mixture is poured into a 1 L cartridge, as far as possible without bubbles, and is immediately introduced into the borehole.

The following process is carried out for extraction tests using threaded rods M12, according to ETAG 001 PART 5:

Firstly, boreholes (diameter 14 mm; depth 72 mm) are made in a horizontal concrete test piece (concrete type C20/C25) using a hammer drill. The boreholes are cleaned by means of compressed air (2×6 bar), a wire brush (2 x) and again by compressed air (2×6 bar). For fastening purposes, the boreholes are then filled up, by two thirds from the bottom of the bore, with the relevant curable epoxide resin composition to be tested. A threaded rod is manually pressed into each borehole. The mortar excess is removed using a spatula. After the time specified for the particular test, the threaded rod is pulled until failure and the failure load is measured.

TABLE 9

| | Failure load in N/mm² after a predetermined curing time: | | | |
|---|---|---|---|---|
| | 3 h | 6 h | 24 h | Composition of the organic proportion of the curing agent component |
| Example 7 | 0.5 | 28.2 | 37.3 | 45% MBS2 +12% novolac + 43% 1,3-BAC |
| Comparative example 4 | <0.4 | 2.4 | 37.8 | 45% MBS2+55% 1,3-BAC |
| Example 8 | 1.2* | 21.3 | 38.2 | 45% MBS1B + 12% novolac + 43% mXDA |
| Comparative example 5 | <0.4 | 0.9 | 38.8 | 45% MBS1B + 55% mXDA |
| Example 9 | 4 | 33.8 | 39.1 | 3% Epikure 132 + 12% novolac + 5% mXDA |
| Comparative example 6 | <0.4 | 26.1 | 39.0 | 94% Epikure 132 + 6% mXDA |
| Example 10 | 1.8 | 29.2 | 37.1 | 88% mXDA-resorcinol-based Mannich base in mXDA + 12% novolac |
| Comparative example 7 | <0.4 | 23.5 | 38.9 | 88% mXDA-resorcinol-based Mannich base in mXDA + 12% mXDA |
| Example 11 | 4.5 | 34.0 | 35.6 | 88% mXDA-resorcinol-based Mannich base in mXDA + 12% bisphenol F |
| Example 12 | 1.5 | 30.9 | 32.6 | 92% Epikure 132 + 8% bisphenol F |
| Example 13 | 1.2 | 31.4 | 37.8 | 92% Epikure 132 + 8% bisphenol F-isomer mixture |
| Example 14 | <0.4 | 29.8 | 38.3 | 95% Epikure 132 + 5% bisphenol F-isomer mixture |

*after 4.5 h

The epoxide resin compositions according to the invention comprising curing agent components according to examples 7 to 14 exhibit substantially more rapid curing than the epoxide resin composition comprising the curing agent components according to comparative examples 4 to 7. The mortar compositions produced using the curing agent components according to the invention can be subjected to loading after only 6 h. This makes it possible to considerably reduce waiting times before the next processing step and to allow subsequent processing works to be carried out much earlier.

The invention claimed is:

1. A curing agent component for a multicomponent epoxide resin composition, comprising:
    as a curing agent, at least one Mannich base and at least one amine that is reactive with respect to epoxide groups, and
    at least one polyphenol selected from the group consisting of novolac resins as an accelerant,
    wherein the at least one Mannich base can be obtained by:
        reacting at least one phenolic compound selected from the group consisting of phenol, styrenated phenol, catechol, resorcinol, hydroquinone, hydroxyhydroquinone, phloroglucinol, pyrogallol, o-cresol, m-cresol, p-cresol, bisphenols, and mixtures thereof, with at least one aldehyde or at least one aldehyde precursor and at least one amine having at least two active hydrogen atoms in the molecule which are bonded to a nitrogen atom,
    said Mannich base is contained in the curing agent component in a proportion of from 10 to 70 wt. %, based on the organic proportion of the curing agent component,
    said at least one polyphenol is contained in the curing agent component in a proportion of from 5 to 30 wt. %, based on organic proportions of the curing agent component,
    said at least one polyphenol corresponds to the following formula:

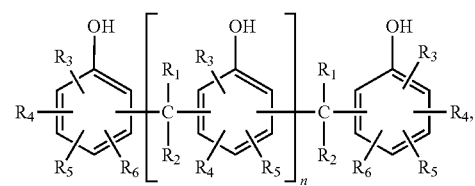

in which
    $R_1$ and $R_2$ represent, independently of one another, H or —$CH_3$;
    $R_3$, $R_4$, $R_5$, and $R_6$ represent, independently of one another, H, —$CH_3$, an aliphatic radical, or an alkaryl radical: and where n is 0 to 20: and
    said at least one amine is contained in the curing agent component in a proportion of from 60 to 80 wt. % based on the organic proportion of the curing agent component.

2. The curing agent component according to claim 1, wherein the at least one amine that is reactive with respect to epoxide groups is at least one selected from the group consisting of aliphatic, alicyclic, araliphatic, and aromatic amines, the amine having on average at least two reactive hydrogen atoms per molecule which are bonded to a nitrogen atom.

3. The curing agent component according to claim 2, wherein the at least one amine that is reactive with respect to epoxide groups is a polyamine having at least two amino groups in the molecule which are bonded to a nitrogen atom.

4. The curing agent component according to claim 1, wherein the at least one phenolic compound is selected from the group consisting of phenol and styrenated phenol, and mixtures thereof.

5. The curing agent component according to claim 1, wherein the at least one aldehyde is an aliphatic aldehyde, and wherein the at least one aldehyde precursor comprises trioxane or paraformaldehyde.

6. The curing agent component according to claim 5, wherein the at least one aldehyde is formaldehyde.

7. The curing agent component according to claim 1, wherein the at least one Mannich base is formed using the at least one amine that is reactive with respect to epoxide groups.

8. The curing agent component according to claim 7, wherein the at east one amine is a polyamine.

9. The curing agent component according to claim 1, wherein the at least one polyphenol corresponds to the following formula:

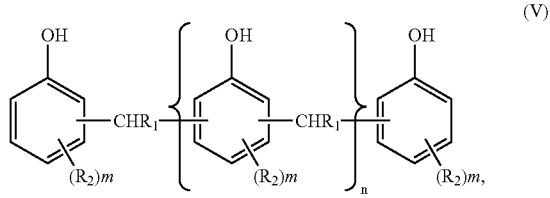

in which
$R_1$ represents H;
$R_2$ represents a $C_1$-$C_{15}$ alkyl;
m is 0, 1, or 2; and
n is 0 to 15.

10. The curing agent component according to claim 9, wherein $R_2$ represents —$CH_3$ and m is 1 or 2, or $R_2$ represents tert-butyl or a $C_1$-$C_{15}$ alkyl and m is 1.

11. The curing agent component according to claim 1, wherein the at least one polyphenol is contained in the curing agent component in a proportion of from 8 to 25 wt. %.

12. The curing agent component according to claim 1, wherein the curing agent component further comprises at least one additive selected from the group consisting of diluents, solvents, accelerants, silanes, thickeners, and inorganic fillers.

13. A multicomponent epoxide resin composition, comprising:
    at least one epoxide resin component (A) containing at least one curable epoxide resin and optionally a reactive diluent, and
    at least one curing agent component (B) according to claim 1,
    wherein the at least one epoxide resin component (A) and the curing agent component (B) are separate from one another.

14. The multicomponent epoxide resin composition according to claim 13, wherein the multicomponent epoxide resin composition further comprises at least one additive selected from the group consisting of co-accelerants, adhesion promoters, reactive diluents, thickeners, and fillers.

15. The curing agent according to claim 1, wherein n=1-20.

* * * * *